United States Patent
Nishibori

[11] Patent Number: 5,869,138
[45] Date of Patent: Feb. 9, 1999

[54] METHOD FOR FORMING PATTERN ON A SYNTHETIC WOOD BOARD

[75] Inventor: Sadao Nishibori, Tokyo, Japan

[73] Assignee: EIN Engineering Co., Ltd., Tokyo, Japan

[21] Appl. No.: 789,415

[22] Filed: Jan. 29, 1997

[30] Foreign Application Priority Data

Feb. 9, 1996 [JP] Japan ................................. 8-023700

[51] Int. Cl.⁶ .............................. B05D 3/12; B05D 1/38; B05D 5/00; B29C 47/00
[52] U.S. Cl. ......................... 427/274; 427/256; 427/261; 427/262; 427/267; 427/270; 427/280; 427/291; 427/325; 427/371; 427/402; 264/148; 264/176.1; 264/299
[58] Field of Search ..................... 427/256, 261, 427/262, 267, 270, 274, 280, 291, 325, 371, 402; 264/148, 176.1, 299

[56] References Cited

U.S. PATENT DOCUMENTS

| | | | |
|---|---|---|---|
| 3,467,538 | 9/1969 | Best ........................................ | 427/291 |
| 3,486,919 | 12/1969 | Dreazy et al. ........................... | 427/267 |
| 3,846,522 | 11/1974 | Goldman .................................. | 264/25 |
| 3,936,518 | 2/1976 | Soda et al. . | |
| 4,279,790 | 7/1981 | Nakajima ........................... | 260/17.4 R |
| 4,324,748 | 4/1982 | Hatakeyama et al. . | |
| 4,358,418 | 11/1982 | Heggenstaller . | |
| 4,361,530 | 11/1982 | Peer . | |
| 4,505,869 | 3/1985 | Nishibori ................................ | 264/115 |
| 4,610,900 | 9/1986 | Nishibori .................................. | 428/15 |
| 4,624,976 | 11/1986 | Amano et al. . | |
| 5,028,286 | 7/1991 | Hsu ....................................... | 156/62.4 |
| 5,055,247 | 10/1991 | Ueda et al. . | |
| 5,082,602 | 1/1992 | Brooks et al. . | |
| 5,088,910 | 2/1992 | Goforth et al. . | |
| 5,217,655 | 6/1993 | Schmidt . | |
| 5,323,971 | 6/1994 | Nishibori et al. . | |
| 5,332,602 | 7/1994 | Barre et al. . | |
| 5,413,746 | 5/1995 | Birjukov . | |
| 5,413,814 | 5/1995 | Bowen et al. .......................... | 427/262 |
| 5,417,904 | 5/1995 | Razi et al. . | |

FOREIGN PATENT DOCUMENTS

| | | |
|---|---|---|
| 0139986 | 5/1985 | European Pat. Off. . |
| 0172436 | 2/1986 | European Pat. Off. . |
| 426619 | 5/1991 | European Pat. Off. . |
| 1175421 | 6/1959 | Germany . |
| 61-16965 | 1/1986 | Japan . |
| H359804 | 9/1991 | Japan . |
| H47283 | 2/1992 | Japan . |

Primary Examiner—Michael Lusignan
Assistant Examiner—Michael Barr
Attorney, Agent, or Firm—Shlesinger, Arkwright & Garvey LLP

[57] ABSTRACT

The present invention provides a method for forming a pattern on a synthetic wood board to form, on a surface of the synthetic wood board, a pattern such as wooden grain and the like which is close to natural wood, to enhance the reality of woody like appearance. The synthetic wood board is formed by mixing 35–80 wt % of thermoplastic resin material and 20–65 wt %. By a first grinding process, the synthetic wood board is formed at its entire surface of at least one side thereof with a large number of wound stripes in one direction. By a colorant coating process, a colorant is coated on the surface on which said wound stripes are formed, the colorant impregnates in wood meal on the surface to generate blur. And some colorant remain in recess portion of the wound stripes to form recess pigment layer. By a second grinding process, the entire surface on which the colorant is coated is ground and abraded except the recess pigment layer to form a large number of the wound stripes, thereby forming a pattern having woody like appearance. By a woody grain printing process, a woody grain pattern is printed on the abraded surface. With these process, a pattern having woody like appearance is formed by synergism of the pattern and woody grain pattern.

17 Claims, 7 Drawing Sheets

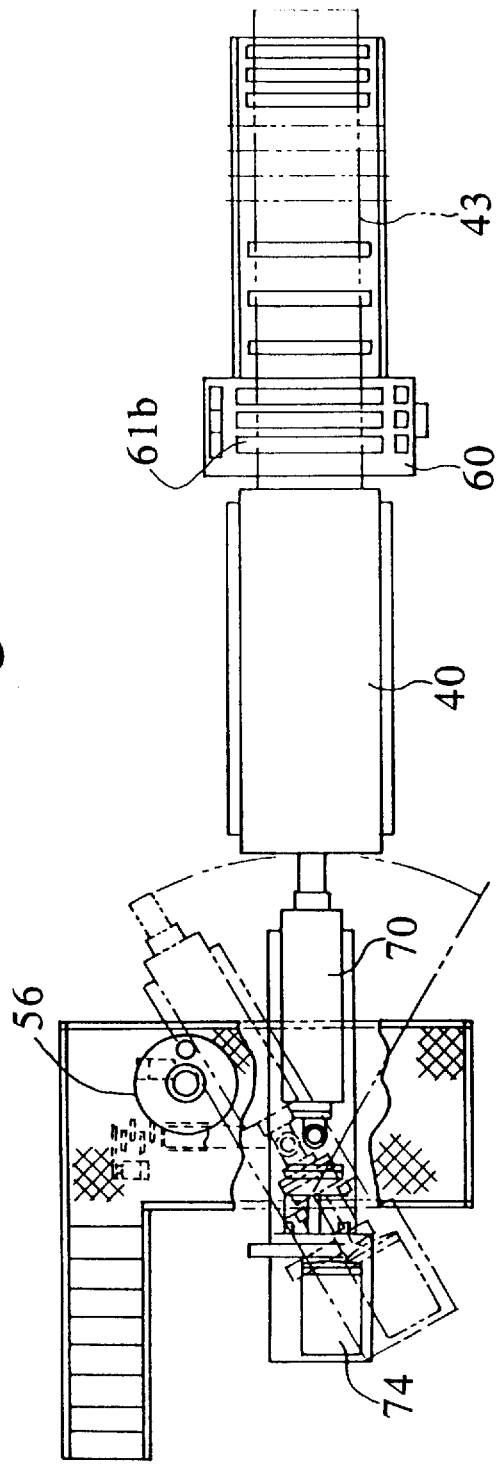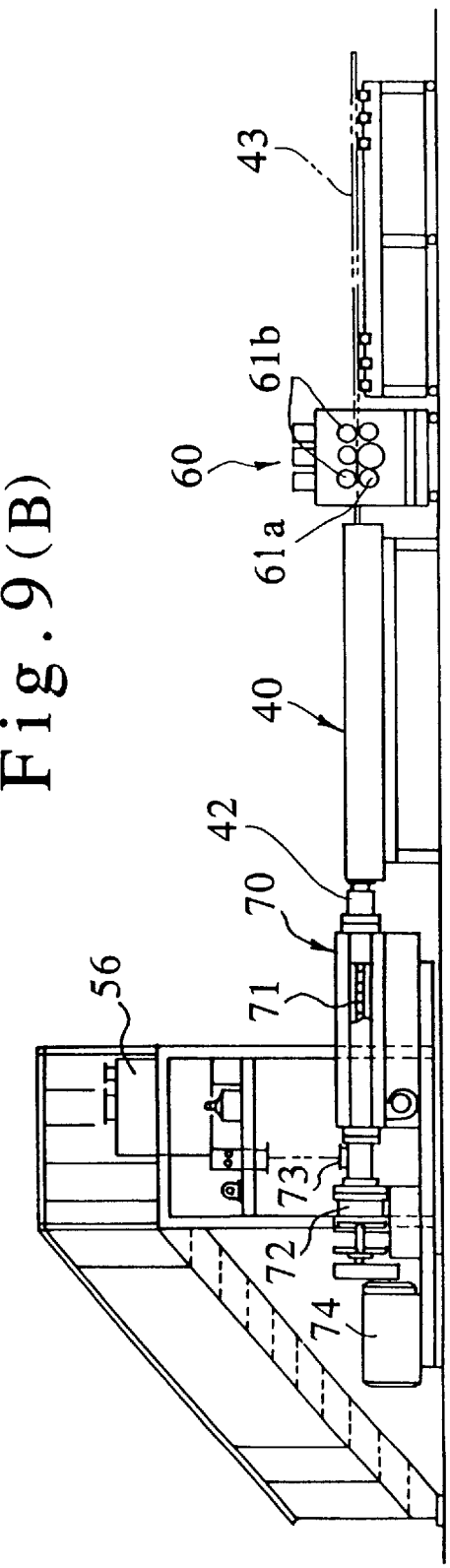

METHOD FOR FORMING PATTERN ON A SYNTHETIC WOOD BOARD

BACKGROUND OF THE INVENTION

1. Field of the Invention

The present invention relates to a method for forming a pattern such as wooden grain and the like on a surface of a synthetic wood board which is made of cellulose crushed material and thermoplastic resin material.

The synthetic wood board comprises wood meal obtained by pulverizing wood such as discarded constructional material or discarded materials of other products, or cellulose crushed material such as chaff, bagasse, crushed chip material or pulpwood. A large quantity of such synthetic wood boards are widely used for automobiles, appliances, living supplies and the like. The synthetic wood board is obtained by mixing thermoplastic resin materials which was obtained from a large number of discarded various thermoplastic resin waste materials with the above mentioned cellulose crushed material, and heating, kneading and molding the same. Therefore, the synthetic wood boards are extremely effective recycle products which reuse various discarded products. Heretofore, attempts have been made to develop molded resin products based on cellulose crushed materials such as wood meal of the above mentioned type, so as to improve resistance to water or heat, and the like. Such development of this kind of synthetic wood board have been made in view of securement of timber resource by requirement of environmental protection of earth, and in view of increase of timber cost, and visual deep latency requirement with respect to wood products. Further, developments have been demanded to enhance the value for the utilization of the synthetic wood boards as recycle products, by forming a deep wooden grain which is peculiarity of natural wood so as to provide a woody like appearance. Such wooden grain should have a surface in which the refractive index varies complicatedly, caused by the wood meal which is exposed to a surface on the synthetic wood board and where, light is irregularly reflected and will not be directly reflected. The present invention relates to the pattern forming method of the synthetic wood board according to such requirement.

The present invention is suitable for all usage of timber. The pattern formed by the invention can be used on decorative panel, wall material which had conventionally formed as plastic products, floor material, various decorative compound flooring boards, blocks, decorative floor boards, decorative boards made of natural wood, faced hard boards, or frame works having thickness of 30 mm or more as inner or outer decorative products for furniture, construction material, automobiles vehicles, and ships.

2. Description of the Prior Art

The synthetic wood board had conventionally been formed by mixing cellulose crushed material and thermoplastic resin, and kneading the same by extrusion process and molded into plate like shape. Such synthetic wood board had woody like appearance because it used cellulose crushed material as the main molding material. But there was still a need for approaching natural wood. Therefore, the resin skin layer on the surface of the synthetic wood board was removed by sanding, so as to provide a woody like appearance of cellulose crushed material more effectively.

However, the conventional synthetic wood board did not have a wooden grain and thus, woody like appearance of natural wood could not be obtained.

By printing such wooden grain on the surface of the conventional synthetic wood board, it was possible to make it look closer to a surface of natural wood. However, the resulting wooden grain pattern was monotonic and not deep, and thus was far from the appearance of natural wood.

The present invention has been accomplished to solve the above problems, and the object of the invention is to provide a pattern forming method of a synthetic wood board by forming, on a surface of the synthetic wood board, a pattern such as wooden grain which is close to the natural wood so as to improve its woody like appearance. More particularly, the object of the invention is to provide a method in which, by mixing cellulose crushed material and thermoplastic resin material of the synthetic wood board at an appropriate mixing ratio a woody like appearance of the synthetic wood board can be obtained, and by heating and kneading the resulting material to extrude the same into a molding die by a screw to mold the synthetic wood board, and forming a pattern such as a wooden grain in which the refractive index varies complicated by the wood meal which is exposed to a surface on the synthetic wood board, and light is irregularly reflected and will not be directly reflected.

SUMMARY OF THE INVENTION

To achieve the above object, according to the present invention, there is provided a method for forming a pattern on a synthetic wood board 11, comprising at least:

a first grinding process for forming a large number of wound stripes 15 in one direction on the entire surface of at least one side of a synthetic wood board 11 formed by mixing 20–65 wt % of cellulose crushed material and 35–80 wt % of thermoplastic resin material;

a process for applying a colorant on the surface on which the wound stripes 15 are formed;

a second grinding process for grinding and abrading the entire surface of the colorant applied surface of the synthetic wood board 11 except a recess pigment layer, thereby forming a large number of the wound stripes 15 to form a pattern (for example a blurred wooden grain pattern 19); and a process for printing a wooden grain pattern 21 on the abraded surface.

The synthetic wood board 11 may be a thin synthetic wood board 11 which is formed by mixing 20–65 wt % of cellulose crushed material and 35–80 wt % of thermoplastic resin material, and which is sliced at thickness of 0.2–50 mm.

Another method for forming a pattern on the synthetic wood board 11 of the invention comprises at least:

a grinding process for forming a large number of wound stripes 15 in one direction on the entire surface of at least one side of a synthetic wood board 11, thereby removing a surface skin layer 14 of synthetic wood board 11 to expose the cellulose crushed material;

a process for printing a wooden grain pattern on the surface on which the wound stripes 15 are formed; and a process for applying a transparent paint on the printed surface.

Another method for forming a pattern on the synthetic wood board 11 of the invention comprises at least:

a first grinding process for mixing, heating and kneading 20–65 wt % of cellulose crushed material having water content of 0.3 wt % or less and 35–80 wt % of thermoplastic resin material, and extruding the extruding material into a molding die by a screw to make an extrusion material and cooling slowly the same, and applying to the extrusion material a controlling force which acts against the extruding force thereof to enhance density of the extrusion material to provide a synthetic wood board 11, so as to form a large number of wound stripes 15 in one direction on the entire surface of at least one side of the synthetic wood board 11, thereby removing a surface skin layer 14 of the synthetic wood board 11 to expose the cellulose crushed material;

a process for applying a colorant onto the surface on which the wound stripes 15 are formed,;

a second grinding process for grinding and abrading the entire surface of the synthetic wood board 11 on which the colorant is applied, except a recess pigment layer, so as to form a large number of the wound stripes 18, thereby forming a blurred wooden grain pattern (19); and a process for printing a wooden pattern on the abraded surface.

The synthetic wood board 11 may be obtained by: applying stirring and impact force to cellulose crushed material having average particle diameter of 10 mesh or less, and frictionally grinding and stirring and impacting the same to generate a shearing exothermic heat by shearing force based on the stirring and impact force, lowering the water content of the cellulose crushed material down to 0.3 wt % by the shearing exothermic heat to pulverize and dry the cellulose crushed material, and then mixing 20–65 wt % of cellulose crushed material having water content of within 0.3 wt % or less and 35–80 wt % of thermoplastic resin material, and heating and kneading the same, and extruding the extruding material from a molding die by a screw to make an extrusion material and cooling slowly the same, and applying to the extrusion material a controlling force which acts against the extruding force to enhance the density of the extrusion material.

It is preferable that the cellulose crushed material within the synthetic wood board 11 is wood meal having mesh of 50–170 m.

It is preferable that in the first grinding process, a large number of wound stripes 15 are formed in one direction on the entire surface of both sides of the synthetic wood board 11.

It is preferable that in the second grinding process, the blurred wooden grain pattern (19) is formed by forming a large number of wound stripes 15 on the entire surface of the synthetic wood board 11 on which the colorant is coated, except a recess pigment layer, in the same direction as the wound stripes 15 formed in the first grinding process.

The synthetic wood board 11 is obtained by mixing, in polypropylene or polyethylene as thermoplastic resin material, wood meal as cellulose crushed material at a mixing ratio of 30–65 wt %, more preferably, 40–65 wt %, and most preferably, 50–55 wt %.

The synthetic wood board 11 is obtained by mixing, in PVC as thermoplastic resin material, wood meal as cellulose crushed material, at a mixing ratio of 20–65 wt %, and more preferably, 30–52 wt %.

The synthetic wood board is obtained by mixing, in ABS, nylon or polycarbonate as thermoplastic resin material, wood meal as cellulose crushed material, at a mixing ratio of 20–50 wt %, and more preferably, 30–40 wt %.

It is preferable that the synthetic wood board 11 is obtained by mixing, in cellulose crushed material, 20–30 wt % of titanium oxide to enhance the degree of white color. This is preferable to obtain woody like appearance of white wood such as fire tree and mahogany.

BRIEF DESCRIPTION OF THE DRAWINGS

The objects and advantages of the invention will become understood from the following detailed description of preferred embodiments thereof in connection with the accompanying drawings in which like numerals designate like elements, and in which:

FIG. 8 shows an embodiment of the present invention and shows a line for pulverizing and drying cellulose crushed material and for manufacturing the synthetic wood meal; wherein

FIG. 9 shows a manufacturing line of the synthetic wood board; wherein FIG. 9(A) is a plane view and FIG. 9(B) is a front view.

DETAILED DESCRIPTION OF THE PREFERRED EMBODIMENT

Figure 1:
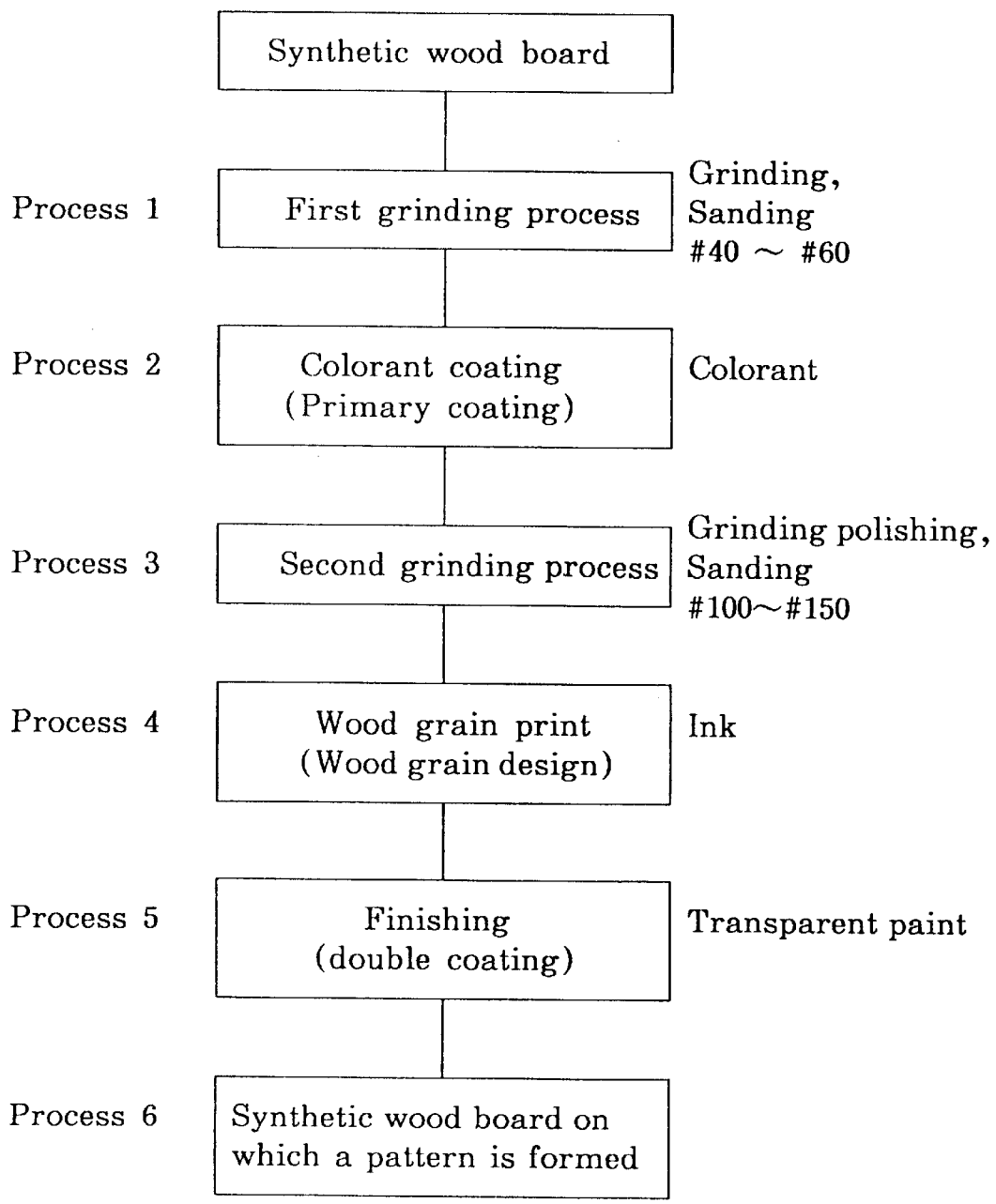
FIG. 1 shows process of method for forming a pattern on a synthetic wood board according to one embodiment.

A method for forming a pattern on a synthetic wood board according to the present invention will now be explained with reference to the accompanying drawings, by way of an example for forming a pattern such as a grain of wood, onto a surface of the synthetic wood board. The synthetic wood board is obtained by mixing wood meal of cellulose crushed material and PVC (polyvinyl chloride) of thermoplastic resin material, and heating and kneading and squeezing the same, by extruding with a screw into a molding die, and by cooling slowly the extruding material. FIG. 1 shows process according to one embodiment of the method for forming a pattern synthetic wood board. Each the process will be explained hereinafter based on FIG. 1.

Synthetic wood board

Figure 2:
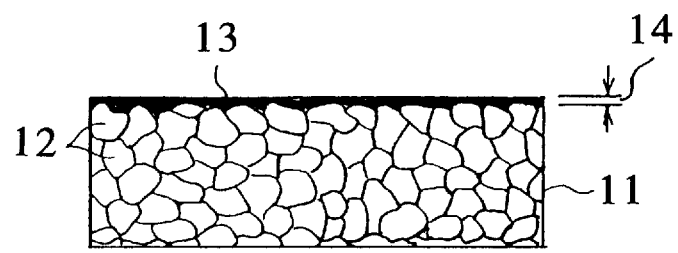
FIG. 2 is a vertical section of the synthetic wood board which is used for the embodiment of the present invention.

Firstly, FIG. 2 shows a vertical section of synthetic wood board 11 extruded from the molding die. This synthetic wood board 11 was formed to have a thickness of 2.5–50 mm, a width of 900 mm, and a length of 2700 mm. A surface of the synthetic wood board 11 is covered with a surface skin layer 14 comprising a thermoplastic resin 13, so that wood meal 12 is not exposed on the surface.

The synthetic wood board 11 of the present embodiment was formed by mixing 35–80 wt % of PVC as thermoplastic resin material into 20–65 wt % of wood meal as cellulose crushed material.

The main cellulose crushed material of molding blank of synthetic wood board includes chaff, bagasse, crushed chip material, pulpwood and the like, and such material is finely pulverized into the average particle diameter of 50–170μ.

Except PVC (polyvinyl chloride) of the present embodiment, the following materials may be used, separately or in combination, as thermoplastic resin materials: ABS, PP (polypropylene), PE (polyethylene), PC (polycarbonate), nylon and the like. As thermoplastic resin material, the followings may be used: one which is obtained by pulverizing various discarded synthetic resins, removing resin coating films therefrom and reforming the same as recycled thermoplastic resin material; or one which is obtained by mixing virgin thermoplastic resin material or the recycled thermoplastic resin material. As to the manufacturing process of the synthetic wood board 11, a detailed explanation will be made later.

The present invention is also applicable to a thin synthetic wood board having a thickness of 2 mm or less. The thin or sheet like synthetic wood board is widely used as a general plate material, a paper wall material, a projection plate (decorative single plate) which is attached on a surface of ordinary plywood class as general plate for the purpose of decoration. The thin synthetic wood board may be obtained, for example, by slicing a synthetic wood board of 50 mm thickness, into 0.2–2 mm thickness. The sliced thin synthetic wood board has a sliced surface, where wood meal is exposed on the surface. There are several kinds of slicers. In one of them, a blade moves, and in another one, a fretch moves. Further, there are a horizontal type in which the moving direction is lateral, and a vertical type in which the moving direction is vertical. The blade is mounted at a bias angle of 5°–30°, and the angle can be adjusted in accordance with a material to be sliced. By the synthetic wood board heating prior to slicing, cutting characteristics are improved. For example, when the thermoplastic resin material of a composition element of the synthetic wood board is PVC, it is easy to slice the same into 0.2 mm thickness using the above mentioned slicer, by heating the same to 70° C. in a boiling water tank. The sliced synthetic wood board is heated and pressed into a flat plate.

Figure 10:
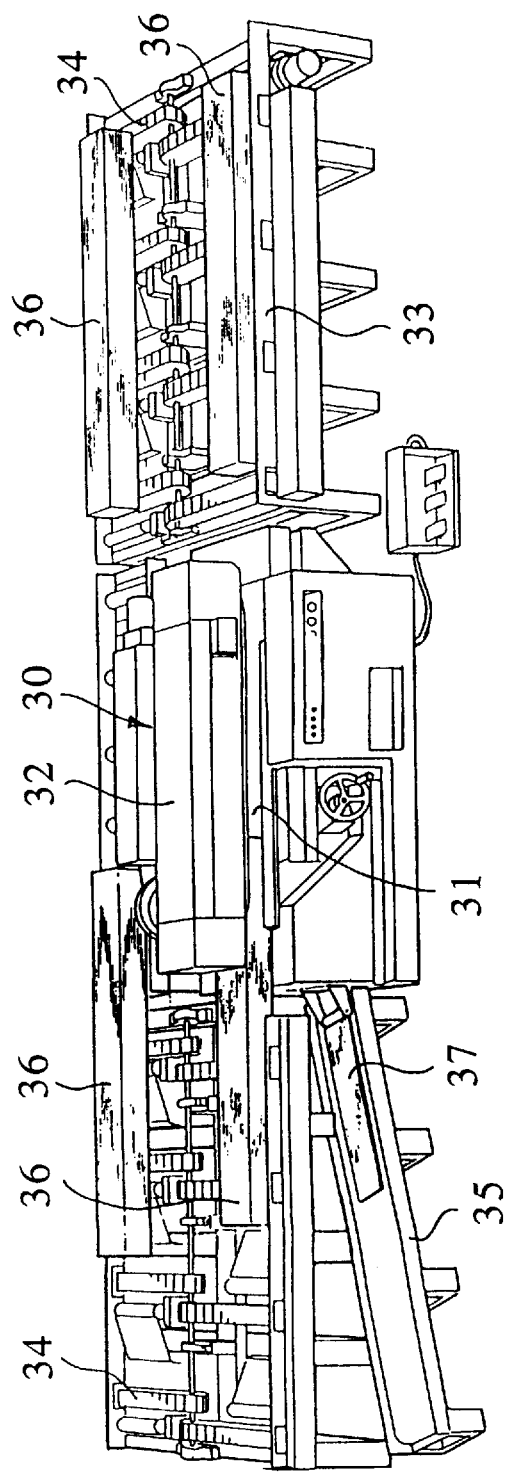
FIG. 10 is a perspective view of a slicer and transfer device used in embodiments of the present invention.

As an example of the slicer, an explanation will now be made on slicing a synthetic wood board using a slicer 30 as shown in FIG. 10. The synthetic wood board 36 (flitch) which is heated in the boiling water tank (not shown) is placed on a conveyer 34 of a transfer device 33 shown at a right side of the slicer 30 in FIG. 10 by means of a hoist crane (not shown). The transfer device 33 is operated to transfer the synthetic wood board 36 to the left slicer 30, so as to slice the thin synthetic wood board 37. The slicer 30 has a fixed blade, and the synthetic wood board 36 runs in a horizontal direction on a table surface 31 from which a cutting edge of the blade projects. The synthetic wood board 36 is clamped by a roller of the feeder mechanism 32 which is vertically movable mounted above the table surface 31. By rotating the roller by a rotation means, the synthetic wood board 36 runs on the table surface 31 and is sliced by the cutting edge of the blade at a desired thickness. The sliced thin synthetic wood board 37 is fed below the blade, and comes out from the lower portion of the slicer 30 to a discharge passage 35, sent down an edge tool and out of the lower part of slicer 30 into discharge passage 35. On the other hand, the synthetic wood board 36 runs leftward on a plane of FIG. 10 on the transfer device 33, and is then transferred in a direction rightwardly perpendicular to the running direction. Further, the synthetic wood board 36 is transferred to a direction rightwardly perpendicular to the transferring direction, i. e., the rightward direction on the plane of FIG. 10, and is then returned to the original position. The synthetic wood board 36 which is a raw material is repeatedly transferred through the mentioned circulated transferring process, and is repeatedly sliced by the slicer. A number of synthetic wood boards 36 are placed on the transfer device, and are sequentially sliced. The sliced thin synthetic wood board 37 is heated by a dryer device such as a roll dryer and the like, while stress or deformation of the plates are removed by being pressed between a number of rolls. Such a thin synthetic wood board may be obtained not only by the method of slicing using the mentioned slicer, but also by mixing thermoplastic resin material and cellulose crushed material, and heating and kneading and squeezing the same, and then forming into a sheet or film like shape, by another molding process such as roller calendar process, extrusion process (T die process, inflation process), casting process.

In the present embodiment, the mentioned thick synthetic wood board will be explained hereinafter. This plate is the same as that obtained by extrusion process except that the wood meal is already exposed on the sliced surface of the thin synthetic wood board.

Sanding (1); first grinding process

Figure 3A:
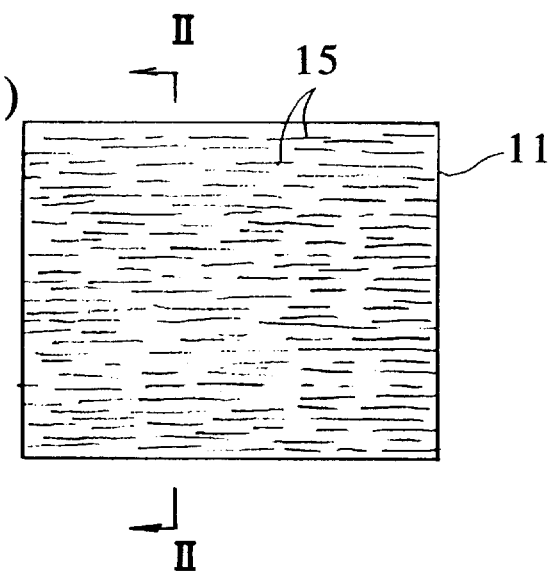
FIG. 3(A) shows the synthetic wood board of FIG. 2 which is subjected to sanding, and illustrates a surface of the synthetic wood board.
Figure 3B:
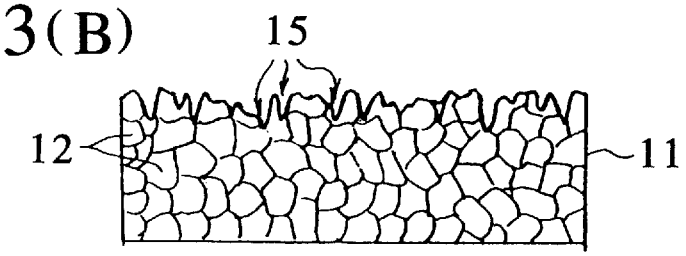
FIG. 3(B) is a sectional view taken along the arrow 11—11 in FIG. 3(A)
Figure 7:
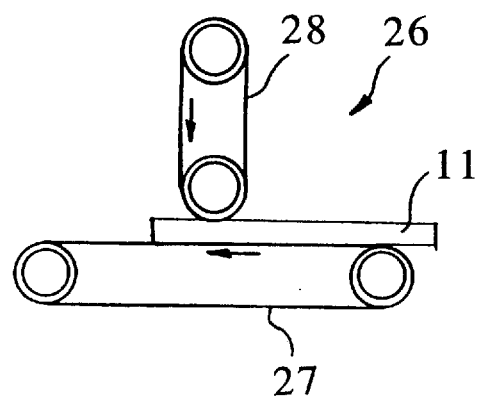
FIG. 7 is a schematic view of a sander used in the embodiment of the present invention.

In this process, a surface of the synthetic wood board 11 is ground. By sanding the surface of the synthetic wood board 11 in one direction toward its longitudinal direction by rough sand paper (abrasive cloth paper) such as #40–60 sand paper for example, so that a large number of wound stripes 15 are formed on the entire surface of the synthetic wood board 11 as shown in FIG. 3(A). As shown in FIG. 3(B), heights of recesses and projections of the wound stripes 15 are large, and depth, width, and length thereof are varied. The surface skin layer 14 is removed, and wood meal 12 is exposed on the surface. When sanding, it is desirable to blow off or suck the ground powder so that the powder will not remain within the wound stripes 15. As the sander, there exist a drum sander, a wide belt sander and the like, and it is effective to use the side belt sander. FIG. 7 shows one example of such wide belt sander 26. The wide belt sander 26 comprises a conveyer belt 27 rotated in a horizontal direction by a rotating means, and an annular endless sand paper 28 rotated by another rotating means disposed above the conveyer belt 27. The sand paper 28 is provided such that its lowermost surface can be moved toward or away from an upper surface of the conveyer belt 27. A distance between the sand paper 28 and the upper surface of the conveyer belt 27 is adjusted in accordance with the thickness of the synthetic wood board 11. The rotational direction of the sand paper 28 is a rotational direction of the conveyer belt 27, i. e., the opposite direction of the synthetic wood board 11 which is to be treated, so that the surface of the synthetic wood board 11 fed by the conveyer belt 27 is effectively ground. In generally, the wide belt sander has a high speed of 6–30 m/min.

In the sanding process, it is preferable to sand the opposite surfaces of the synthetic wood board 11 so as to prevent a camber of the synthetic wood board 11 due to residual inner stress.

Colorant coating (prime coating)

Next, solvent colorant of water-soluble colorant such as lacquer is coated on the entire sanding surface of the synthetic wood board 11 by a roll or a spray. As a coating process, a spray coating is used for a solid or three dimensional portion, a static electric coating is used to a portion, and a curtain coater, roller coater, a bottom coater or the like is used for a plane portion. Next, the synthetic wood board after application of colorant coating is dried naturally.

Figure 4:
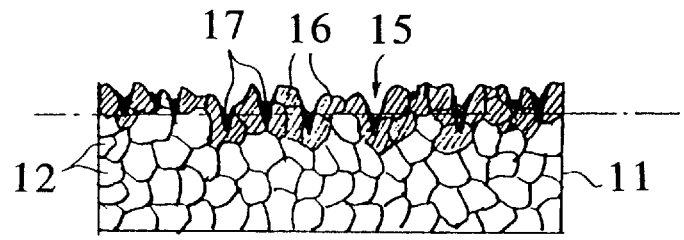
FIG. 4 shows the sanding surface of the synthetic wood board in FIG. 3 and is a vertical sectional view in the same position as FIG. 3.

FIG. 4 shows a condition in which a colorant is coated on the entire sanding surface of the synthetic wood board 11 of FIG. 3. The colorant permeates into a depth within the recess of the wound stripes 15 and forms a recess pigment layer 17. The colorant permeates not only into the surface of the wood meal 12 exposed on the surface of the synthetic wood board 11 but also into the wood meal 12 itself, the colorant floats up. A yellow colorant is used in the present embodiment. The colored wood meal 16 is referred to as "colored wood meal" hereinafter. Since the colorant permeates into the wood meal, adherence of the colorant is enhanced.

If the wood meal and the thermoplastic resin are compared, it can be said that a surface of thermoplastic resin is smooth, and hence, adherence of the colorant is poor, but adherence with respect to the wood meal is excellent.

Sanding (2); second grinding process

Figure 5A:
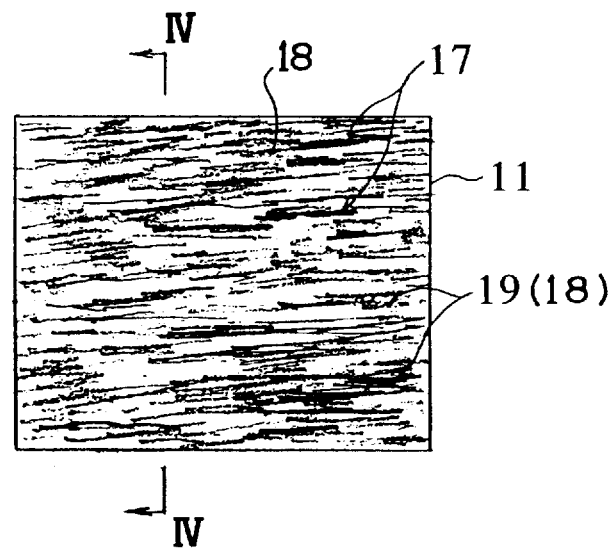
FIG. 5(A) shows a colored surface of the synthetic wood board of FIG. 4 which is subjected to sanding, and illustrates a surface of the synthetic wood board.
Figure 5B:
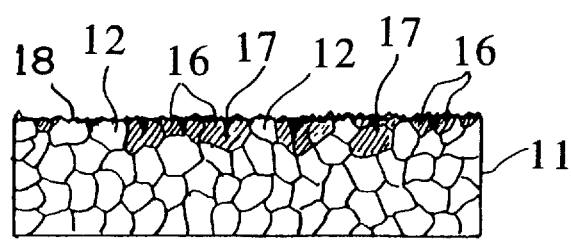
FIG. 5(B) is a sectional view taken along the arrow IV—IV in FIG. 5(A)
Figure 6:
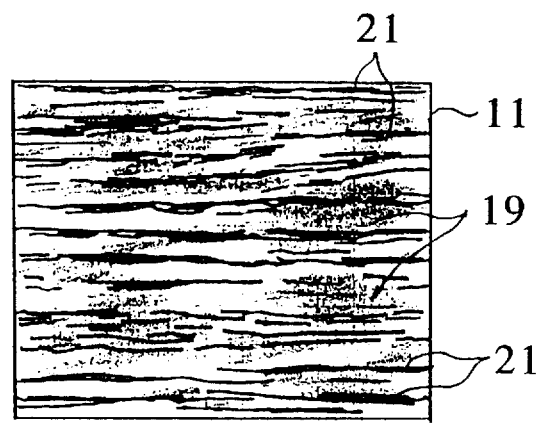
FIG. 6 shows the sanding surface of the synthetic wood board on which a wooden grain pattern is printed, and illustrates the surface of the synthetic wood board.

Next, the colorant coated surface of the synthetic wood board 11 is subjected to grinding and abrasion again. Using the above mentioned wide belt sander 26 shown in FIG. 7, the colorant coated surface of the synthetic wood board 11 is subjected to grinding and abrasion except the recessed pigment layer 17, in the same direction as the sanding direction in the first grinding process toward the longitudinal direction of the colorant coated surface by using #100, for example, which is more rough than the sand paper used in the first grinding process (sanding (1)), thereby forming a large number of wound stripes 18 on the surface of the synthetic wood board 11. The colored wood meal 16 is partially removed from the vertical sectional surface of the synthetic wood board 11 as shown in FIG. 5(B). When sanding, it is desirable to blow off or suck the ground powder so that the powder will not remain within the wound stripes 18 and 15. Both the colored wood meal 16 which was not ground and the recess pigment layer 17 (yellow in the present embodiment) which remained within the recess of the wound stripe 15 form a pattern like a wooden grain as shown in FIG. 5(A). In this pattern, a blurred wooden grain pattern 19 (it is also referred to as "blurred grain pattern" hereinafter) appears which is blurred in shading and which is close to a grain of natural wood, by synergism of the facts that the colorant penetrates into the wood meal and comes out to the surface, shading of each the colored wood meal 16 are different from each other because each the colored wood meal 16 is cut at different portion, and that the recess pigment layer 17 remains within the recess of the wound stripe 15. The recess pigment layer 17 which remained after grinding and abrasion of the projection of the uneven surface by means of the sand paper in the second grinding process becomes a pattern corresponding to conduit of grain of the natural wood.

The grinding direction of the sander is the same as the grinding direction of the sander in the first grinding process in sanding (1), and is not perpendicular to each other. Moreover, because the recess pigment layer 17 is not subject to the grinding and abrasion, the sand paper used in this process is preferably rougher than the sand paper used in the first grinding process, and preferably the sand paper will be #100, #120, the #150 and the like. In addition, by making the sanding directions of the first and second grinding process the same, reality of natural wood appearance can be provided. However, depending on the usage, the sanding direction of the second grinding process may be perpendicular to the grinding direction of the sander in the first grinding process, so as to make the wound stripe 18 pattern perpendicular to the wound stripe 15 by the first grinding process. In this case, however, the grinding and abrasion must be done so as to leave the recess pigment layer 17.

Wooden grain printing; Printing process

Next, only the wooden grain pattern 21 such as wooden grain, straight grain, cross grain or the like are directly printed by role print, flexographic printing on the surface on which the blurred wooden grain pattern 19 is formed by the sanding (2) process. The wooden grain 21 to be printed may be of monochrome or polychrome, and may include various patterns of grain of natural wood such as grain of wood stem, board grain, and ball-like shape, as well as abstract design. As a result, the synthetic wood board 11 is varied in reflection ratio due to the shading blurred wooden grain pattern 19 by the sanding process (2), and wooden grain pattern 21 by the wooden grain printing process. Therefore, the plate 11 is finished as a plate having almost the same wooden grain pattern of the natural wood having no reflection and having deep wooden grain pattern.

The blurred wooden grain pattern 21 is printed on the wood meal on the surface of the synthetic wood board 11. Therefore, the adherence of the ink of the wooden grain pattern 21 is enhanced. Further, the ink also enters in the wound stripe 18 and thus, the adherence of the ink is further enhanced.

Finish coating (Final coating)

In this process, a transparent paint such as clear lacquer or matting agent is coated on the printing surface of the wooden grain pattern on the synthetic wood board 11, and dried to be finished. As the finish coating, aminoalukid, lacquer, polyester, a polyurethane or the like can be used.

In the method for forming a pattern on the synthetic wood board according to the present invention, the mixing ratio of the cellulose crushed material which is a composition element of the synthetic wood board and thermoplastic resin material exert a great influence on the degree of difficulty of sanding and on the appearance of reality of the wood like appearance. Such relationship will now be explained below.

When the thermoplastic resin material is PP or polyethylene, and the wood meal content is 40 wt % or less, sanding can not be conducted. If the wood meal content is 30 wt % or less, the colorant runs away and thus, it is difficult to color. Therefore, if the wood meal content is 30 wt % or less, even if the wooden grain printing is conducted, the finished surface becomes just like a plastic surface.

Therefore, the contents of wood meal should be 30–65 wt %, PP or polyethylene should be 35–70 wt %, and preferable contents of wood meal should be 40–65 wt %, PP or polyethylene should be 35–60 wt % and the most preferable contents of the wood meal should be 50–55 wt %, and PP or polyethylene should be 45–50 wt %.

When the thermoplastic resin material is PVC, coloring characteristic of the paint is excellent and sanding can also be conducted. But if the wood meal is 20 wt % or less, the finished surface becomes like a plastic surface. If the wood meal increases, sanding becomes easier. If the wood meal is 30 wt %, the reality of woody appearance can be obtained.

Therefore, the wood meal should be 20–65 wt % and PVC should be 35–80 wt %. The preferable contents of the wood meal is 30–52 wt %, PVC should be 48–70 wt %.

When the thermoplastic resin material is ABS, nylon, or polycarbonate, the coloring characteristic of the paint is excellent as in the PVC. But if the content of the wood meal is 20 wt % or less, the finished surface becomes like a plastic surface.

If the content of wood meal increases, sanding becomes easier, and if such content is 30 wt % or more, the reality of woody appearance can be obtained.

Therefore, the preferable content of the wood meal is 20–50 wt %, and content of each of the above-mentioned resin material is 50–80 wt %. The especially preferable content of the wood meal is 30–40 wt %, and content of each of the above-mentioned resin material is 60–70 wt %.

Moreover, when synthetic wood board is molded, it is possible to increase the degree of white color of the synthetic wood board to provide a white synthetic wood board, by mixing 20–30 wt % of titanium oxide to cellulose crushed material. For example, 10–15 kg of titanium oxide is mixed to 50 kg of wood meal. By forming the wooden grain by the method of the present invention on the white synthetic wood board, it is possible to obtain the woody like appearance of white wood such as hinoki (Japanese cypress), mahogany, teak, rose wood and the like. It is also possible to adjust the color of the colorant and wooden grain of the printing to form wooden grain pattern having various colors.

Method for forming a pattern on other synthetic wood board.

Other method for forming pattern of the synthetic wood board which is different from that of the previous embodiment will now be described.

Here, the same name is allocated to the same process as used in the previous embodiment so as to simplify the explanation.

Firstly, in the first grinding process, a large number of wound strips 15 are formed on the entire surface of the synthetic wood board by sanding using sand paper such as #40–#60 and the like, in one direction. As a result, the surface skin layer of the synthetic wood board is removed, and wood meal is exposed on the surface. As in the wooden grain printing process in the previous embodiment, the wooden grain pattern 21 is printed on the surface which is formed with the wound stripes 15 by various printing method. Ink of the wooden grain pattern enters the wood meal on the surface and therefore, the ink also enters the wound stripes 15 which makes the ink ooze to provide a wooden grain pattern 21 having woody like appearance. As in the finish coating (double coating) process in the previous embodiment, a transparent paint such as clear lacquer or frosting agent is applied to the print surface of the synthetic wood board, and the surface is dried and finished. These processes make the paint such as clear lacquer impregnate the wood meal, thereby enhancing the woody like appearance.

Manufacturing process of synthetic wood board

As a manufacturing method of synthetic wood board used in the previous embodiment, an explanation will now be made with reference to the drawings by way of an example. This board is formed by pulverizing and drying the wood meal of cellulose crushed material, gelling and kneading and squeezing the wood meal and PVC of the thermoplastic resin material, cooling, pulverizing and regulating the wooden grain to provide the synthetic wood meal, and heating and kneading and squeezing the same to extrude into the molding die using the screw.

Raw material wood of wood meal

As raw material wood of wood meal, discarded construction material or wood shavings obtained during saw milling process or wood working process may be used. Such discarded material is pulverized into small pieces by the known grinder, for example a cutter mill.

The cutter mill comprises: a cylindrical cutter mill body having a throw-in opening into which raw material to be ground is thrown; a rotating blade which rotates in a horizontal direction by the rotating means within the cutter mill body; a fixed blade which is fixed to the cutter mill body though a slight clearance with respect to locus of rotation of the cutting edge of the rotating blade; a mesh or screen through which a small piece whose one side is about 3 mm can pass, such as punching metal through which wood meal pulverized into small pieces by the rotating blade and the fixed blade; and a discharge opening for discharging the wood meal which passed through the screen. Some cutter mill includes a horizontal rotating axis of the rotating blade and a screen provided below the rotating blade, as in the case of a hard crusher produced by Holai company.

The shape of the wood meal pulverized into small pieces by the cutter mill is undetermined, and such wood meal may be of rectangle, square or undetermined shape whose one side is 3 mm or less, or may be of cylindrical shape having a diameter of 1–3 mm and a length of around 1–3 mm.

Figure 8A:
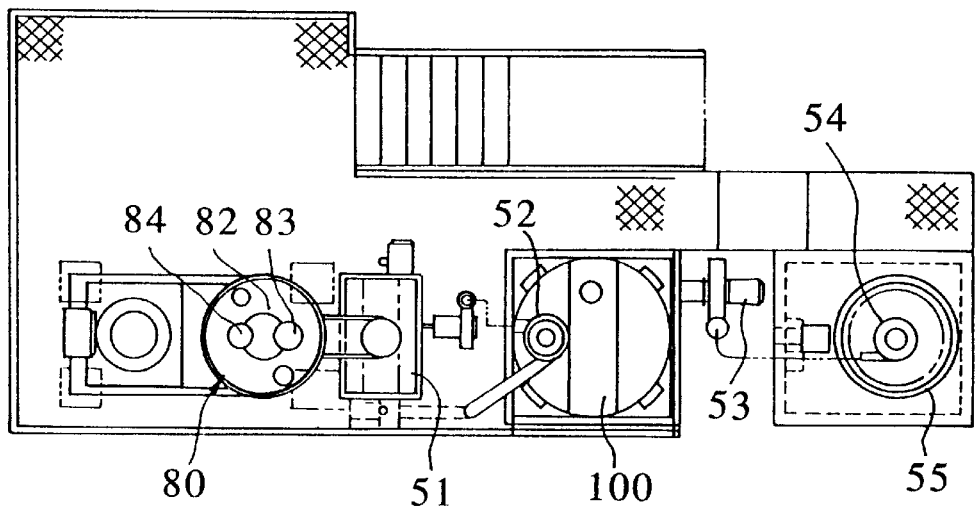
FIG. 8(A) is a plane view and FIG. 8(B) is a front view.
Figure 8B:
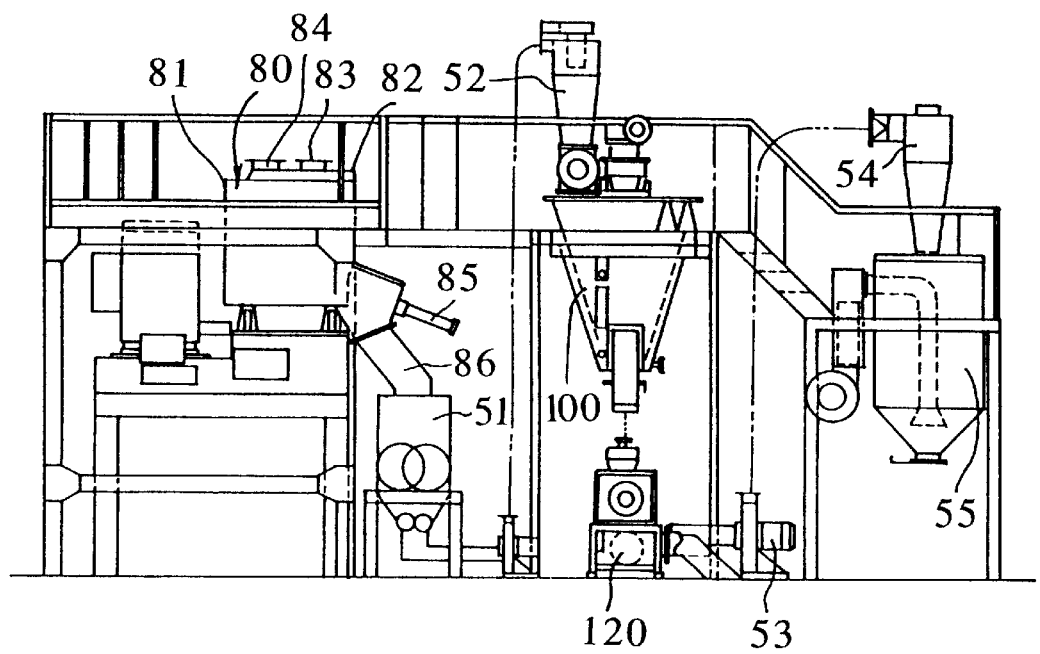

Process for pulverization-dry of wood meal and for manufacturing synthetic wood meal FIGS. 8(A) and (B) show one example of pulverization-dry of wood meal and manufacturing line of synthetic wood meal. The process for pulverizing and drying the above mentioned pulverized wood meal within a mixer 80 for manufacturing the synthetic wood meal will be explained hereinafter. The numeral 80 designates a fluid mixing and kneading and squeezing means for pulverizing and drying the wood meal, and in the present embodiment, it is conveniently referred to as "a mixer". The mixer 80 comprises a cylindrical mixer body 81 having a closed upper surface, and an upper lid 82 for covering the closed surface for opening and closing the latter.

An air supply pipe 83 for supplying dry air, and an exhaust pipe 84 for discharging vapor or gas generated from wood within the mixer are brought into communication with the upper lid 82. Further, a discharge opening is provided in the vicinity of a bottom surface of the mixer body and a cylinder for covering the discharge opening in an opening and closing manner. The numeral 86 designates an exhaust duct which is communicated to the discharge opening. Provided on a central portion of the bottom surface of the mixer body 81 are a scraper which rotates at a high speed in a horizontal direction by a rotating means such as a motor, and a plurality of stirring and impact blade. Each stirring and impact blade is of two blade type which is symmetrical with respect to a rotation axis. The scraper slightly slides on the bottom surface of the mixer body 81 to rotate, so as to stir the raw material within the mixer body 81 such that the raw material will not stay at the bottom surface and will circulate upward. The scraper also shire the treated raw material such that the raw material will not stay at the bottom surface of the mixer body 81.

(1) Each stirring and impact blade and the scraper are rotated at a high speed of 920 rpm. The upper lid 82 was opened, and from such opening, 23 kg of wood meal including water content of 8.35 wt % and 2 kg of titanium oxide were thrown into the mixer body 81, and they were stirred for 15 minutes. Because the shearing force based on the stirring and impact blade which rotates at a high speed of 920 rpm is high, the wood meal within the mixer 80 are frictionally ground by such shearing force. Further, amount of generated frictional heat (it is referred as "shearing heat") caused by friction between the stirring and impact blade and wood meal or between wood meals are improved. Therefore, the temperature within the mixer 80 rises and the vaporization degree of gas such as vapor or gas generated from wood within the wood meal is enhanced. Moreover, the wood meal is finely pulverized within the mixer 80 and thus, drying efficiency is enhanced. Also, because the wood meal is dried, pulverization is further facilitated. As a result, a large quantity of wood meal can be pulverized and dried for extremely short time.

A large quantity of vapor or gas generated from the wood meal within the mixer body 81 are included in dry air which is supplied from a dry air supply source through the air supply pipe 83 to mixer body 81, and are discharged from the exhaust pipe 84, and are sucked into a collector by a blower.

The preferable stirring speed of the stirring and impact blade is in the range of 900–980 rpm, and more preferably, in the range of 900–950 rpm. This is because if the speed is too fast, the wood meal would fly up due to the centrifugal force of the stirring and impact blade and thus, the mixing effect would be lower; and on the other hand, if the speed is too slow, the amount of generation of shearing heat by the shearing force of the stirring and impact blade would be small and thus, the drying efficiency would be lowered.

The pulverized and dried wood meal obtained in the above manner includes a water content of 0.16 wt %, and is closer to wooden grain shape as a whole, and is rounded. The surface of the wood meal is relatively smooth and the wood meal has high density. The wood meal obtained in this manner does not generate agglomeration all most at all, and dispersion characteristic is excellent with respect to liquid solution.

(2) Next, thermoplastic resin material, namely, 12 kg of polyvinyl chloride 12 kg and 12 kg of discarded agricultural films are thrown into the mixer 80. And the thermoplastic resin material and dry wood meal of water content of 0.16 wt % are gelled and kneaded and squeezed for 8 minutes and 20 seconds.

In this process, the obtained gelled material is "kneaded material" which is a mass having a diameter of about 10–100 mm. This kneaded material is formed to have thermoplastic resin material attached to the entire surface of the powder. Since the wood meal is enclosed by the thermoplastic resin material, each the wood meal can maintain the low water content which is not influenced by external environment.

Besides the thermoplastic resin material, an additive such as urea, carbonic calcium, titanium oxide, a pigment can be thrown within mixer 80.

The calcium carbonate stabilizes the size of the synthetic wood board which is extruded by an extruder or the like, and contributes to lower the expansion and contraction due to variation in temperature, and prevents the molded product of extruding working from being deformed. Further the calcium carbonate itself is inexpensive.

Moreover, fluidity and dispersion of the titanium oxide in liquid solution is excellent, and contributes to remarkably lower expansion and contraction due to variation in temperature with respect to the synthetic wood board extruded by the extruder or the like.

Further, the urea consists of ammonia, phenol, melamine and the like, and acts as a neutralizing agent for the gas produced by the wood.

Moreover, when the thermoplastic resin material and wood meal are kneaded within the extruder or mixer 80, causing the entire surroundings of the wood meal is covered with the thermoplastic resin material, moisture within the wood meal is enclosed by the thermoplastic resin material. Therefore, even if they dried thereafter, the water content of the wood meal is not lowered. Therefore, before the thermoplastic resin material and wood meal are kneaded, it is desirable to lower the water content of the wood meal. Especially, when a control force against the extruding force of the material to be extruded is applied to the material within the molding die as shown in the manufacturing example of the synthetic wood board, if the water content of the wood meal is 1 wt % or more, moisture comes out at the fusion section of the molding die because the extruded material is highly pressed, and thus, the temperature within the molding die is lowered and the dough may not be able to be extruded. For this reason, it is preferable to set the water content of the wood meal in a range of 1 wt % or less, and more preferably, in a range of 0.3 wt % or less.

(3) Next, the motor is rotated at a low speed and the discharge opening is opened by the cylinder 85 to scrape out the "kneaded material" within the mixer body 81 to the discharge duct to supply the same to the next process.

(4) When the kneaded material becomes a mass having a size of about 100–150 mm, it is roughly ground down to about particle diameter or 30 mm or less by the grinder 51 if necessary.

(5) The roughly ground kneaded material is sucked by the blower 53 to supply the same to the cyclone 54 where it is classified into powder dust and kneaded material. The classified powder dust is supplied to the collector and the kneaded material is supplied to a cooling mixer 100 mounted below the cyclone 54.

(6) The kneaded material is sufficiently cooled and granulated to form "granulation synthetic wood meal".

(7) The "granulation synthetic wood meal" is regulated by a regulating means of a cutter mill 120 to form "synthetic wood meal".

(8) Preservation of synthetic wood meal

The "synthetic wood meal" is sucked by the blower 53 to supply the same to the cyclone 54, and it is classified into powder dust and synthetic wood meal. The powder dust is fed to the collector and the synthetic wood meal is fed to a hopper drier 55 mounted below the cyclone 54. The synthetic wood meal is always kept dry by a heater within the hopper drier 55 and is preserved.

Among the above described procedure, the main processes are: pulverization and dry process of wood meal within the mixer 80 which is pulverizing and drying means as well as a fluid mixing and kneading means; gelling and kneading process of the wood meal and thermoplastic resin material; and a granulation process of the granulation synthetic wood meal by a regulating means such as the cutter mill. Other processes may be added or omitted if necessary.

Manufacturing process of synthetic wood board

A manufacturing process of synthetic wood board by extrusion molding using the above described synthetic wood meal will be explained below.

FIGS. 9(A) and (B) show an example of manufacturing line of synthetic wood board. A preservation tank 56 for preserving the synthetic wood meal is provided at an upper portion of the extruder. The synthetic wood meal is transferred to a hopper of the extruder 70 by a spiral screw provided at a lower portion of the preservation tank 56. A motor 74 for rotating the extruder 70 and a screw 71 in the extruder 70 is provided at an upper surface of a base plate 77 which is rotatable in a horizontal direction. Therefore, it is possible to easily attach and detach members such as an extrusion die, screw and the like mounted at a tip end of the extruder 70, and it is possible to mount the extrusion die to the molding die 40.

The synthetic wood meal is thrown to the hopper 73 of the extruding machine 70 from the preservation tank 56, and is heated and kneaded within the extruder 70, and then is discharged from the extrusion die 42 to the molding die 40 and formed into a synthetic board. The control force acting in a direction opposite from the extrusion direction of the synthetic board is applied to the synthetic board by a brake means 60 to form synthetic wood board. The brake means 60 is not necessarily required, and even if the brake means 60 is omitted, the synthetic wood board can still be formed.

In general, the extruder 70 is in the form of screw, and there exist several types of structure, such as single-shaft extruder, multi-shaft extruder, modified type or combined type. The screw 71 is driven by a motor 74 shown in FIGS. 9(A) and (B) through a gear speed reducer 72, and is rotated within a barrel. The synthetic wood meal thrown from the hopper 73 is heated by a band heater mounted in the barrel, and is moved forward along a channel of the screw 71 and sequentially melted and kneaded in a condition in which the wood meal is uniformly dispersed in the thermoplastic resin material. And the extruding material is extruded as an extrusion material from the screw and extrusion die 42.

The extrusion die 42 is in the form of an elongated rectangle having a width of 50 mm and height of 12 mm so as to form a thick front end surface. A rear end surface of the extrusion die 42 is formed with a circular inlet opening having a diameter of 50 mm, and from which a flowing passage is formed such as to gradually deform the sectional shaped toward the front end surface. The fluid state of the extrusion material within the flow passage is not complicated but is excellent. Further, since an injection opening is large and thus a large quantity of extrusion material can be discharged and density can be promoted. Therefore, clog is not generated in the extrusion material in which wood meal having large flowing resistance is mixed, as in the case of usual die.

The molding die 40 has a shape similar to molding die of so called T-type die, and comprises an inlet connected to the extrusion die 42 and forming a chamber for forming the extrusion material which is introduced from the inlet into a plate-like shape having a wide width and a predetermined thickness. The forming chamber is formed therein with a melting portion having a heater around its outer periphery. The heater extends about one fifth of the length of the forming chamber from the vicinity of its inlet toward the extrusion direction of the extrusion material. Other portion of the forming chamber is formed with a slowly cooling portion in which a cooling pipe is disposed, around which cooling liquid such as water or oil flows. The slowly cooling portion extends from the boundary of the melting portion toward the extrusion direction of the extrusion material to the die exit. The forming chamber is formed to have a quadrate shaped section through a metal spacer which is provided at its opposite side edges with upper and lower two metal plates.

The forming chamber is arranged such that a height thereof can be changed by exchanging one or both of the upper and lower two metal plates. The forming chamber according to the present embodiment is an elongated quadrate section whose width is 900 mm and height is 12 mm.

The melting portion of the forming chamber is formed such that opposite ends thereof curves in a widthwise direction of the forming die 40 to extend to opposite ends of the forming chamber in its longitudinal direction so as to form a so called coathanger type.

The melting portion may be formed into a straight manifold rather than the coathanger type. However, since coat hanger type has superior flow properties of the extrusion material, the latter type is preferable.

Sheets made of fluororesin and having thickness of 0.25 mm is affixed on upper and lower inner wall surfaces, or upper, lower, left and right four inner surfaces of the forming chamber. Rather than the sheet, fluororesin can directly be coated on the upper, lower, left and right four inner wall surfaces.

The extrusion material is introduced from the inlet of the forming die 40 and is flowed in the widthwise direction of the forming chamber. When the extruded material is extruded by the melting portion of the forming chamber, because the width of the melting portion of the forming chamber is suddenly spread, the extrusion material flowing within the melting portion can keep an excellent kneaded condition, and is extruded in a condition in which the wood meal is uniformly dispersed. Extruded material is introduced in slowly cooling portion of molding chamber and the extruded material have slowly cooled and formed into the synthetic wood board which hardens and possesses thickness of 12 mm and it is pushed out by the extruded material afterward.

The fluororesin possesses a heat resistance of about 300° C., and smooth surface with low frictional coefficient, and has a characteristic that the thermal conductivity coefficient is low as compared with metal. Therefore, wood meal in the extrusion material flows without receiving large resistance, and is smoothly extruded from the die exit as a synthetic board 43 while being cooled slowly. A resisting force is applied to the synthetic board 43 in an opposite direction from the extrusion direction by the brake means 60, so as to restrict the extruding force of the synthetic board 43.

Vertically movably provided on the brake means 60 are: three fixed pinch rollers 61*a* pivotally supported on a trestle; and three free pinch rollers 61*b* contacted to each of the fixed pinch rollers 61*a* under pressure through the synthetic board 43. The brake means 60 is operated by a gear having shafts on which the fixed pinch rollers 61*a* are respectively mounted, and by other gears meshed with the former gears. An input shaft of a powder brake is connected to one of the three fixed pinch rollers 61*a*. The powder brake is so called an electromagnetic brake in which a frictional torque can finely be adjusted electrically.

Therefore, the synthetic wood boards 43 are pressed against the fixed pinch rollers 61*a* by the respective three free pinch rollers 61*b*, so as to control the rotation of the shaft of one of the fixed pinch rollers 61*a* by the powder brake. The same rotation-control force by the frictional torque of the powder brake is applied to three fixed pinch rollers 61*a* which are operatively connected to the fixed pinch roller 61*a* through a plurality of gears.

Therefore, the frictional torque of the powder brake becomes a controlling force against the extruding force of the synthetic wood board 43, which brings the extrusion material within the introducing chamber 12 of the molding die 40 into a further high density and uniform condition, and adhesion properties between the wood meal is enhanced, and bubble, cavity and the like are prevented from being generated. The uniform extrusion material having high adhesion properties is moved forward against the controlling force of the brake means 60 by the extruding force of the extrusion material, and is cooled in the forming chamber. And a more uniform synthetic wood board 43 having a high density properties is formed. The synthetic wood board moves forward while rotating the fixed pinch rollers 61*a* and free pinch rollers 61*b* against the controlling force of the powder brake.

After that, the synthetic wood board which is the synthetic board 43 as a product is cut at desired length by cutting machine such as cutter, shearing, saw machine or the like. If the synthetic board 43 is thin, a cutting machine such as a cutter is used, and if the plate 43 is thick, e. g., 12 mm thickness, a cutting machine such as a shearing, saw machine or the like is used.

TABLE 1

Example for manufacturing synthetic wood board

| | |
|---|---|
| Extruding machine; | Diameter: 65 mm |
| | Single axis type extruding machine |
| Clearance: | 0.2 mm (between screw 71 and barrel) |

TABLE 1-continued

Example for manufacturing synthetic wood board

| | |
|---|---|
| Molding die 40; | Width: 900 mm, Height: 12 mm (vertical section in widthwise direction) |
| Length of molding die: | 600 mm (between inlet of molding chamber and die exit) |
| Discharge amount: | 80 kg/hour |
| Synthetic wood meal | Resin: PVC Mixing ratio: 49 wt % Discarded agricultural film: 24.5 wt % + virgin rigidity; PVC: 24.5 wt % |
| wood meal | Mixing ratio: 51 wt % Particle diameter: about 0.1 mm Water content: 0.4 wt % |
| Stabilizing agent: | Titanium oxide |
| Production ability: | About 1.8 m/time |

The synthetic wood board which is the synthetic board 43 as the product and which has a width of 900 mm and height of 12 mm is cut at every 2,700 mm length to provide synthetic wood board having a weight of 26.4 kg. By setting the height of the molding die 40 at 2–50 mm, a synthetic wood board having a thinness of 2–50 is formed.

Example of manufacturing other synthetic wood board

In the previously described embodiment, the synthetic wood meal obtained by gelling and kneading by the mixer 80 was thrown into the extruder to mold the synthetic wood board by the molding die. Another example for manufacturing the synthetic Wood board will be explained below. wood meal obtained by crushing the raw material into small pieces is subjected to pulverization and drying treatment to make is a dried wood meal having a water content of 0.3 wt % or less. After that, the motor of the mixer 80 is rotated at low speed, and the thermoplastic resin material is thrown into the mixer 80. Next, instead of gelling and kneading this material, this thermoplastic resin material and the dried wood meal are mixed uniformly by the stirring and impact blade at a low speed. Then, the cylinder 85 is operated to open the discharge opening. And the mixed material of the dried wood meal and the thermoplastic resin material within the mixer body 81 by the scraper at a low speed are scrape out to the discharge duct 86. The extruding material is continuously supplied to the hopper of the extruder of the next process to mold the synthetic wood board by the molding die.

If the above materials are mixed by stirring by means of the known stirring and impact device in another place, the wood meal immediately absorbs vapor in atmosphere, and the water content is increased. Therefore, it is preferable to immediately supply such dried powder which is dried to the water content of 0.3 wt % or less in the mixer 80, to the extruder, and apply the treatment. Especially, as described above, if the controlling force against the extruding force by the extrusion material in the molding die is applied, the extrusion material is brought into a tightly compressed state. Therefore, if the water content of the wood meal is 1 wt % or more, moisture comes out from the melting portion of the molding die to lower the temperature of the molding die. For this reason, the extrusion material may not be extruded in some case and thus, caution is required. But, if the controlling force is not applied to the extrusion material in the molding die, such caution is not necessary. If the synthetic wood meal which is obtained by gelling and kneading the wood meal which is dried and whose water content is low, and thermoplastic resin material within the mixer 80 is once kneaded, entire surrounding of each of the wood meal is covered with the thermoplastic resin material. Therefore, such wood meal is completely blocked off from the outside.

Thus, it is possible to heat the synthetic wood meal by the preservation tank or the like in the previously described embodiment to keep its dryness all the time, and to mold the synthetic wood board by applying the control force to the extrusion material of the molding die. However, when the synthetic wood meal is produced, the wood meal is preferably dried to low water content of 1 wt % or less, more preferably 0.5 wt %, and most preferably 0.3 wt % or less, before gelling and kneading with the thermoplastic resin material.

As the present invention is so arranged in the above explained manner, the following effects can be obtained:

(1) The wood meal is exposed on the surface in a degree which is almost the same as the wooden grain of natural wood, and by such wood meal, reflection ratio is varied complicatedly, and pattern and wound stripe having deep blurred coloi shading without light reflection can be formed by synergism of: cellulose crushed material such as wood meal is exposed on the surface by removing the surface skin layer of the synthetic wood board, and the colorant is impregnated with such exposed wood meal, and it is blurred; the synthetic wood board is cut at different location at the second grinding process and different colored wood meals are remained, which provide various shading color; and recess pigment layer which remained within the recess of the wound stripes.

(2) Further, by a combination of the pattern in which shading is blurred by the colored wood meal and wooden grain pattern printed on the pattern forms deep color, and the produce could be obtained which has almost the same level of wooden grain pattern of natural wood.

(3) Also, because the colorant impregnates the wood meal exposed on the surface of the synthetic wood board, the adhesion properties of the colorant is excellent. In addition, ink for printing is printed to the wood meal on the surface of the synthetic wood board and therefore, not only that the adhesion properties of the ink is excellent, but also that ink also impregnates the wound stripes, which further enhances the adhesion properties of the ink. Therefore, the wooden grain pattern could be obtained which is not easily peeled off. Meanwhile, a wooden grain pattern printed on a surface of a decorated plate which is synthetic board such as general veneer was easily peeled off.

(4) Still more, the surface skin layer of the synthetic wood board is removed and cellulose crushed material is exposed. Therefore, if the wooden grain pattern is printed on the surface on which the wound stripes are formed, the printing ink impregnates the wood meal on the surface and the ink also impregnates in the wound stripes deeply, such ink blurs to form wooden grain pattern having the look of reality. In addition, by applying the transparent paint on the printing surface, the paint impregnates in the wood meal on the surface, which enhances the reality of the wooden grain appearance.

(5) The method for forming a pattern on the synthetic wood board according to the present invention can also be applied to sheet-like, film-like or thin plate-like synthetic wood board. Therefore, the present invention provides a method for forming a pattern on the synthetic wood board which can widely be applied to thin plate material, wall paper or projection plate having high grade feeling and woody like appearance without unmatched feeling which can be seen on a conventional wall material (cross).

Thus, the broadest claims that follow are not directed to a machine that is configured in a specific way. Instead, the broadest claims are intended to protect the heart or essence of this breakthrough invention. This invention is clearly new and useful. Moreover, it was not obvious to those ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Now that the invention has been described;
What is claimed is:

1. A method for making a synthetic wood board, comprising the steps of:
   a) drying a cellulose crushed material;
   b) mixing a thermoplastic resin material with said cellulose crushed material to create a mixture;
   c) kneading the mixture to cause the cellulose crushed material to be surrounded by the resin material to form a gelatinous mixture;
   d) cooling, pulverizing and regulating the gelatinous mixture to create a size regulated synthetic wood meal;
   e) heating, kneading and squeezing the synthetic wood meal into a molding die to create an extruded material that exits from the die in an extrusion direction;
   f) cutting the extruded material into a suitable length to form the synthetic wood board;
   g) first grinding the entire surface of one side of the synthetic wood board in one direction to remove a surface skin layer to expose the cellulose crushed material and to create a number of randomly spaced and discontinuous wound stripes oriented in one direction, said wound stripes forming a number of recesses;
   h) applying a colorant on the ground surface to penetrate into and color the exposed cellulose crushed material and to fill said recesses to form a recess pigment layer;
   i) second grinding the ground surface along the same direction as in step (g) to a level such that the recess pigment layer and the colored exposed cellulose material remain and such that additional wound stripes oriented in the same direction as the wound stripes generated in step (g) are generated, thereby forming a wood grain pattern; and
   j) printing a wooden grain pattern on the ground surface.

2. The method of claim 1, wherein the mixture comprises 20–65 wt % of cellulose crushed material and 35–80 wt % of thermoplastic resin material.

3. The method of claim 1, wherein the mixture comprises 35–70 wt % polypropylene or polyethylene and 30–65 wt % cellulose crushed material.

4. The method of claim 1, wherein the mixture comprises 35–60 wt % polypropylene or polyethylene and 40–65 wt % cellulose crushed material.

5. The method of claim 1, wherein the mixture comprises 45–50 wt % polypropylene or polyethylene and 50–55 wt % cellulose crushed material.

6. The method of claim 1, wherein the mixture comprises 35–80 wt % PVC and 20–65 wt % cellulose crushed material.

7. The method of claim 1, wherein the mixture comprises 48–70 wt % PVC and 30–52 wt % cellulose crushed material.

8. The method of claim 1, wherein the mixture comprises 60–70 wt % PVC and 30–40 wt % cellulose crushed material.

9. The method of claim 1, wherein the mixture comprises 50–80 wt % ABS, nylon or polycarbonate and 20–50 wt % cellulose crushed material.

10. The method of claim 1, wherein the cellulose crushed material is 50–170 m mesh.

11. The method of claim 1, and further comprising the step of mixing 20–30 wt % titanium oxide with the crushed cellulose material and the thermoplastic resin material.

12. The method of claim 1, wherein the cellulose crushed material has water content of 0.3 wt % or less.

13. The method of claim 1, wherein the cellulose crushed material has average particle diameter of 10 mesh or less.

14. The method of claim 1, wherein the water content of the cellulose crushed material is lowered to 0.3% or less by grinding and stirring prior to mixing with the thermoplastic resin material.

15. The method of claim 1, and further comprising the step of applying a transparent paint on the printed surface.

16. A process for forming a pattern on a synthetic wood board made from a mixture of cellulose crushed material and synthetic wood board, comprising the steps of:
   a) first grinding the entire surface of one side of the synthetic wood board in one direction to remove a surface skin layer to expose the cellulose crushed material and to create a number of randomly spaced and discontinuous wound stripes oriented in one direction, said wound stripes forming a number of recesses;
   b) applying a colorant on the ground surface to penetrate into and color the exposed cellulose crushed material and to fill said recesses to form a recess pigment layer;
   c) second grinding the ground surface along the same one direction to a level such that the recess pigment layer and the colored exposed cellulose material remain and such that additional wound stripes oriented in the same direction as the wound stripes generated in step (a) are generated, thereby forming a wood grain pattern; and
   d) printing a wooden grain pattern on the ground surface.

17. The method of claim 16, and further comprising the step of applying a transparent paint on the printed surface.

* * * * *